(12) United States Patent
Loftus et al.

(10) Patent No.: US 7,970,534 B2
(45) Date of Patent: Jun. 28, 2011

(54) MOBILE UNIT AND SYSTEM HAVING INTEGRATED MAPPING, COMMUNICATIONS AND TRACKING

(75) Inventors: Thomas Michael Loftus, Great Falls, VA (US); Dorian Sergio Araneda, Lovettesville, VA (US); Michael Daniel Koontz, Jr., Reston, VA (US); James Robert Sherman, Penn Laird, VA (US)

(73) Assignee: Blackbird Technologies, Inc., Herndon, VA (US)

( * ) Notice: Subject to any disclaimer, the term of this patent is extended or adjusted under 35 U.S.C. 154(b) by 899 days.

(21) Appl. No.: 11/894,835

(22) Filed: Aug. 21, 2007

(65) Prior Publication Data

US 2008/0077320 A1   Mar. 27, 2008

Related U.S. Application Data

(60) Provisional application No. 60/840,068, filed on Aug. 24, 2006.

(51) Int. Cl.
*G01C 21/30* (2006.01)

(52) U.S. Cl. ..... 701/208; 701/207; 701/213; 340/539.13

(58) Field of Classification Search .................. 701/208, 701/207, 213, 214; 340/539.13, 539.11, 340/572.8, 438; 455/434, 73, 552.1, 553.1, 455/272

See application file for complete search history.

(56) References Cited

U.S. PATENT DOCUMENTS

| | | | |
|---|---|---|---|
| 5,363,402 A * | 11/1994 | Harmon | 375/132 |
| 5,841,396 A | 11/1998 | Krasner | |
| 5,867,481 A * | 2/1999 | Miyagi | 370/244 |
| 5,875,181 A | 2/1999 | Hsu et al. | |
| 5,940,379 A | 8/1999 | Startup et al. | |
| 6,141,560 A * | 10/2000 | Gillig et al. | 455/553.1 |
| 6,215,498 B1 | 4/2001 | Filo et al. | |
| 6,222,483 B1 | 4/2001 | Twitchell et al. | |
| 6,223,225 B1 * | 4/2001 | Bisdikian et al. | 709/237 |
| 6,327,533 B1 | 12/2001 | Chou | |
| 6,377,210 B1 | 4/2002 | Moore | |
| 6,615,253 B1 | 9/2003 | Bowman-Amuah | |
| 6,804,602 B2 | 10/2004 | Impson et al. | |
| 6,810,293 B1 * | 10/2004 | Chou et al. | 700/90 |
| 6,859,831 B1 | 2/2005 | Gelvin et al. | |
| 6,998,985 B2 | 2/2006 | Reisman et al. | |
| 7,034,678 B2 | 4/2006 | Burkley et al. | |
| 7,065,446 B2 | 6/2006 | Chou | |
| 7,072,668 B2 | 7/2006 | Chou | |
| 7,080,322 B2 | 7/2006 | Abbott et al. | |
| 7,113,864 B2 | 9/2006 | Smith et al. | |
| 7,155,335 B2 | 12/2006 | Rennels | |
| 7,245,216 B2 * | 7/2007 | Burkley et al. | 340/539.13 |

(Continued)

OTHER PUBLICATIONS

Office Action mailed Sep. 14, 2010 for U.S. Appl. No. 11/717,575, filed Mar. 13, 2007.

(Continued)

*Primary Examiner* — Thomas G Black
*Assistant Examiner* — Marthe Marc Coleman (57) ABSTRACT

A handheld device and system includes a mapping module, a tracking module interoperative with the mapping module, and a communications module interoperative with the tracking module and the mapping module. At least two antennae are communicatively connected, via the communications module, to at least one central processing unit. At least one of said at least two antenna is suitable for communicating using at least two distinct communication modes.

23 Claims, 4 Drawing Sheets

U.S. PATENT DOCUMENTS

| | | | |
|---|---|---|---|
| 7,515,071 B2* | 4/2009 | Kong et al. | 341/50 |
| 7,535,417 B2 | 5/2009 | Atkinson | |
| 7,636,560 B2* | 12/2009 | Ku | 455/272 |
| 7,750,801 B2* | 7/2010 | Culpepper et al. | 340/539.13 |
| 7,783,304 B2 | 8/2010 | Himmelstein | |
| 2002/0097181 A1 | 7/2002 | Chou et al. | |
| 2002/0169539 A1* | 11/2002 | Menard et al. | 701/200 |
| 2003/0043761 A1 | 3/2003 | Hladik | |
| 2004/0196182 A1 | 10/2004 | Unnold | |
| 2005/0101350 A1* | 5/2005 | Wang | 455/558 |
| 2005/0135516 A1* | 6/2005 | Javor et al. | 375/347 |
| 2006/0007038 A1 | 1/2006 | Boling et al. | |
| 2006/0009216 A1* | 1/2006 | Welnick et al. | 455/434 |
| 2006/0142052 A1* | 6/2006 | Lai et al. | 455/552.1 |
| 2006/0202817 A1 | 9/2006 | Mackenzie et al. | |
| 2006/0234693 A1* | 10/2006 | Isidore et al. | 455/422.1 |
| 2006/0252999 A1* | 11/2006 | Devaul et al. | 600/300 |
| 2007/0064833 A1* | 3/2007 | Sahota | 375/295 |
| 2007/0123174 A1* | 5/2007 | Wiessner et al. | 455/73 |
| 2008/0288986 A1* | 11/2008 | Foster et al. | 725/62 |
| 2009/0243943 A1* | 10/2009 | Mumbru et al. | 343/702 |
| 2010/0075643 A1* | 3/2010 | Cooper et al. | 455/414.1 |

OTHER PUBLICATIONS

Office Action mailed Mar. 4, 2010 for U.S. Appl. No. 11/717,575, filed Mar. 13, 2007.

Office Action mailed Jun. 4, 2010 for U.S. Appl. No. 11/717,575, filed Mar. 13, 2007.

* cited by examiner

MOBILE UNIT AND SYSTEM HAVING INTEGRATED MAPPING, COMMUNICATIONS AND TRACKING

CROSS-REFERENCE

This application claims the benefit of U.S. Provisional Application Ser. No. 60/840,068, filed Aug. 24, 2006.

BACKGROUND OF THE INVENTION

1. Field of the Invention

The present invention is directed generally to mobile electronics and communications, and, more specifically, to a mobile unit and system having integrated mapping, communications and tracking.

2. Description of the Background

There is an absence in the currently available technological arts of a single device and system that can readily track, locate, and allow communications with, persons and assets "in the field" during wartime or first responder circumstances. Instead, forces operating as first responders or in wartime may be subject to communications theft, communications breakdown, information theft, or lack of knowledge with regard to assistance or other friendly force positioning. Further, such forces presently have no way of tracking the status of fellow forces or important assets.

Rather, such forces are presently asked to carry a myriad of electronic devices to account for contingencies, such as to account for breakdown in a primary communications type, or such as to navigate in ill-defined geographic regions. Such multiple electronic devices may prove larger than is desirable, and may, due to the size and number of such devices, prove cumbersome and generally disadvantageous to forces that are preferably highly mobile.

Thus, a need exists for a mobile, handheld device and system that allows such forces to avoid the disadvantages of carrying multiple electronic devices that, even in combination, fail to carry out desired functionalities, and the need exists to provide such a device and system in a single, optimally sized and configured unit that is readily accessible to command and control users, but only to properly authorized command and control users.

BRIEF SUMMARY OF THE INVENTION

The present invention includes a handheld device, which device includes at least one mapping module, at least one tracking module interoperative with said at least one mapping module, at least one communications module interoperative with each of said at least one tracking module and said at least one mapping module, at least two antennae communicatively connected via said at least one communications module to at least one central processing unit, wherein at least one of said at least two antenna is suitable for communications using at least two distinct communication modes.

The handheld device may further include a GPS receiver for receiving position data. The handheld device may further include at least one sensor for providing information on an external condition.

The system may comprises at least one central server comprising: a communications module; a central processing unit; and a graphical user interface; and a plurality of handheld devices; each handheld device communicating with the at least one central server, each handheld device comprising: at least one mapping module; at least one tracking module interoperative with said at least one mapping module; at least one communications module interoperative with each of said at least one tracking module and said at least one mapping module, said at least one communications module operative in at least two communications modes; a Global Positioning System (GPS) receiver interoperative with at least one of said mapping module, said tracking module and said communications module; at least two antennae communicatively connected via said at least one communications module to at least one central processing unit, wherein at least one of said at least two antenna is suitable for communications using at least two distinct communication modes; wherein the at least one central server can display the location of each of the handheld devices on the graphical user interface.

According to an embodiment of the system, each handheld device may dynamically relay position and direction map data to the at least one central server and/or other handheld devices.

Thus, the present invention provides a mobile, handheld device and system, that allows field forces that avoids the disadvantages of carrying multiple electronic devices that, even in combination, fail to carry out desired functionalities, and the present invention provides such a device, and system, in a single, optimally sized and configured unit that is readily accessible to command and control users, but only to properly authorized command and control users.

BRIEF DESCRIPTION OF THE SEVERAL VIEWS OF THE DRAWINGS

For the present invention to be clearly understood and readily practiced, the present invention will be described in conjunction with the following figures, wherein like reference numerals represent like elements, and wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in typical mapping, tracking and communications systems and devices. Those of ordinary skill in the art will recognize that other elements are desirable and/or required in order to implement the present invention. However, because such elements are well known in the art, and because they do not facilitate a better understanding of the present invention, a discussion of such elements is not provided herein.

The present invention is directed to and includes an integrated hardware and software system that provides integrated mapping, communications, and tracking in a handheld mobile unit communicatively connected to one or more remote, central servers. In an embodiment of the present invention, the required computational capabilities of the handheld mobile unit may be minimized, such as by coordinating the operations of a plurality of such handheld mobile units by an at least partial "thin client" operation (in which the one or more central servers bear the burden of a significant portion of the computational aspects of handheld devices within the system of the present invention), that is, each mobile unit in a system of orchestrated mobile units may be coordinated through, and instructed by, monitored by, and/or reported on by one or more of the centrally located servers, wherein each such server may provide one or more graphical user interfaces ("GUI's") to interested, remote party users tasked with the management of persons and items associated with remotely located ones of the handheld mobile units.

Figure 1:
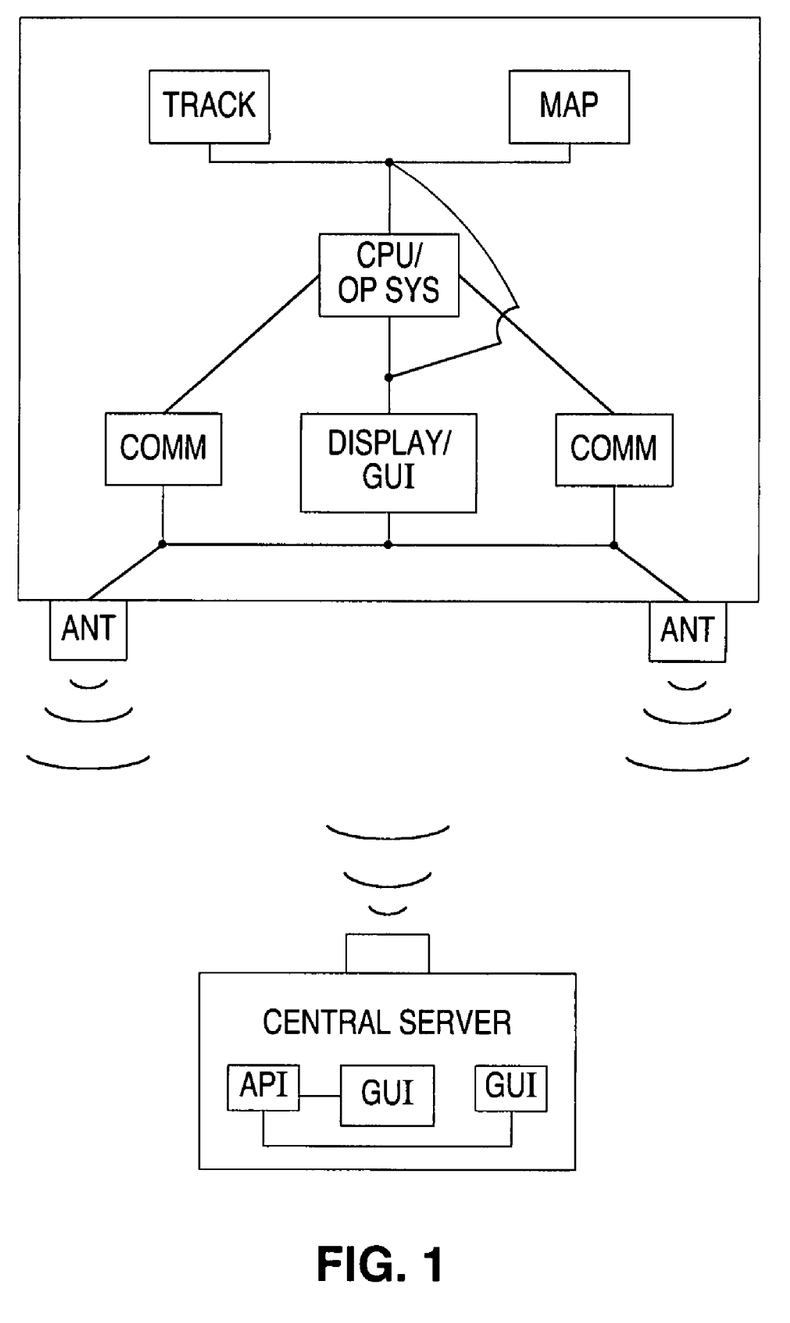
FIG. 1 is a block diagram illustration of the present invention.

More specifically, and as illustrated in the functional block diagram of FIG. 1, the present invention may include a mobile handheld unit operating within a system of the present invention, the handheld mobile unit further including a mapping/location module, a tracking module, and one or more communication module, each of which modules are operatively integrated, such as via an operating system operatively associated with one or more central processing units and associated hardware, with one or more local displays, and each of which modules are operatively integrated with a data encrypting transceiver that communicatively connects the mobile unit with one or more remote central servers, wherein each of such remote servers is operatively connected to one or more GUIs capable of simplistically inter-operating with a like-GUI at the display of the mobile unit. Further, the at least one central processing unit may be provided for on-board mobile processing and operation of the local operating system, wherein the at least one central processing unit is communicatively connected with at least the aforementioned modules, and which operating systems may be accessible to the user of the mobile unit via the local GUI on the local display.

More specifically with regard to the mapping module, the mobile unit may provide, in accordance with positional information available in a particular environment, one or more of a triangulation based mapping system, and a global positioning system ("GPS") based mapping system, on the mobile unit display. For example, the mapping data may be typically supplied using the GPS system, or via a triangulation system in the event a GPS system is not available. Additional position data may be provided by digital equipment, such as a digital compass, such as, for example, a Honeywell HMR 3300 Digital Compass Module.

Further, such mapping may allow for navigation, and may have included therewith navigation tools for frequent destinations, as well as highly specific GPS based directions in response to the entry of a desired location. Such local mapping and navigation tools may be provided to the user using standard imagery formats, such as Arcview or Falcon View image formats, for example. Further, the mapping and navigation may dynamically relay shared position and direction map data, such as map object data, to the central server and/or to select ones of other mobile device users. Such map object data may, for example, be displayed, such as upon a user request, on the mapping software accessible via the GUIs of the central server and/or of other mobile users, such that the appearance of the map data would appear the same to all users, including the user in possession of the mobile device that is being mapped as the device of interest. Such dynamic relaying of mapping and positional data may occur in real time, such as via satellite communications, cellular communications, or the like, or may be batched and downloaded as batched data in order to save communication bandwidth, for example. Further, this dynamic relaying of shared positioning may, for increased data security, be directed from all devices only to and from the central server, wherein the central server might then make available such data to authorized mobile devices also connected to the central server(s), or, alternatively, data may be shared directly between multiple ones of the devices as well as with the central server.

Figure 2:
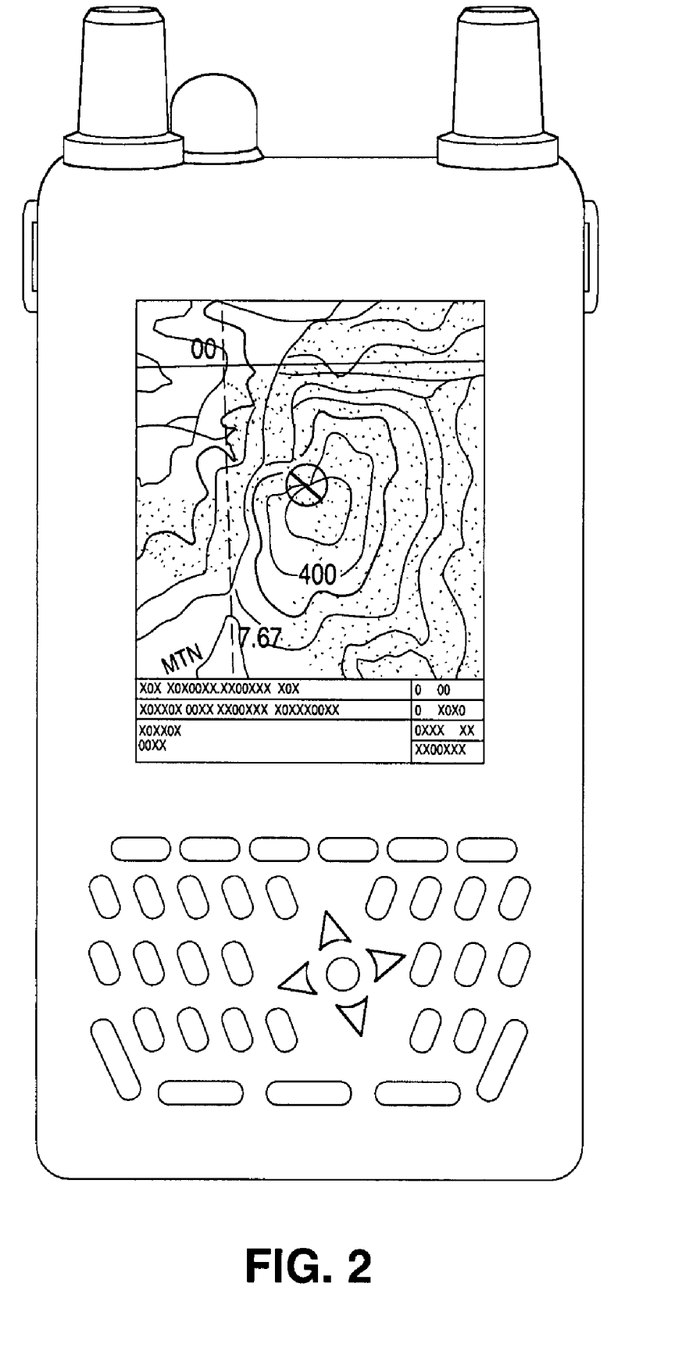
FIG. 2 is a schematic illustration of the present invention.

Returning to FIG. 1 and also with respect to FIG. 2, the mobile device may include a communications module communicatively connected, via the central processor, to associated communications hardware, such as one or more antennae, modems, and amplifiers. For example, in order to perform communication transmission functions, the mobile unit may include a plurality of communication modems controlled by the communication module, such as an Iridium 9601 (Taladaga) Short Burst Data Satellite Modem, and such as a Enfora Enabler IIG Quad Band GSM/GPRS Modem.

The communications module may make available to the device mobile unit to mobile unit communications, and/or mobile unit to central server communications. Such communications are, in a preferred embodiment, globally available, 24 hours, seven days per week. Further, it is preferred that, in the event the failure of one mode of communication in a communication attempt, alternative modes of communication be readily available, and it is further preferable that the prioritization of the use of such various modes of communications be managed by the communication module in conjunction with the central processing unit of the mobile device. For example, the present device may exercise mobile to mobile and mobile to central messaging using the Iridium satellite system, and/or a quad band GSM-SMS/GPRS communications system, in that order of priority use.

Further, the communication module may include emergency modes. For example: a mobile device may be set to act as an emergency locating beacon, or; certain modes of the device may be made active only for communication over those modes in emergencies, such as the use of the 9-1-1 communication system in the United States, or; the mobile device may automatically use particular communication modes in the event of an assessment of damage to the goods or persons being tracked as assets corresponded to the mobile device. As such, the mobile device may be in communication with sensors located on or about certain goods being tracked, or may monitor bodily functions of persons associated with the mobile device. In preferred embodiments, data messaging between mobile devices and between mobile devices and the central server may be encrypted using, for example, standard encryption methodologies, such as AES256 encryption employing central encryption management at the central server. In order to facilitate data message entry, the mobile unit may, for example, include a keyboard, such as a QWERTY keyboard. Using these exemplary embodiments of the present invention, data messaging of any type may occur between mobiles and/or the central server including, but not limited to, the sending of encrypted positional data, the sending of tracking data, the sending of text messages, and/or the sending of voice over IP, and such communications may be initiated automatically by the mobile device under certain circumstances, or may be initiated by the user. Additionally, the mobile device may make available analog communications through the communications module, such as GSM based cellular telephony, and other types of voice capable transmission formats.

Further, with respect to FIG. 1, a tracking module may track assets associated with the mobile unit. The tracking module may track the well being of assets, such as by bodily function monitoring of persons, and such as by environmental circumstance sensing and monitoring of other sensors, such as damage sensors, pressure sensors, weight sensors, and the like, of non-person assets. For example, in military applications the mobile units of the present device may allow for the tracking of "blue force", that is, friendly force, persons. The well being of such persons may be tracked by the tracking module, as may be the assets associated with those persons, and the mobile unit mapping module may similarly make available to other users the position of such persons and assets in conjunction with the tracking of their well being.

Data and progress from and for each of the modules, and the hardware associated therewith, within a particular mobile unit may preferably be made available to a user via a display that displays a graphical user interface, in accordance with FIGS. 1 and 2. In preferred embodiments, the display may provide clarity of use in a variety of operating environments, such as in a variety of lighting conditions, and as such may be, for example, a liquid crystal display (LCD), such as a Sharp LDM-03176A liquid crystal display panel.

Illustrated on the display may be the aforementioned local GUI. The local GUI may, for example, allow mobile unit operators to view the location of other operators, as well as their own locations, and to share items of interest, such as asset tracking information, on the display. Further, on the local display a remote central server operator may be able to provide information to an operator in the field, and likewise an operator in the field may be able to provide information to a central server user. Further, the central server may provide the capability for a central server user to "push" information, such as data, new features, or applications to mobile units, such as through the use of an application programmer interface (API), and such as to provide updated capabilities, situational awareness or testing information. As such, the display on the mobile unit may preferably include a windowed environment, wherein at least one of the windows presents the location based mapping of the present invention to the mobile unit user. For example, the mobile unit may employ an embedded windowing environment, such as the QTOPIA (QT) embedded windowing environment.

More specifically with regard to the exemplary central server implementation of the present invention, the central server may feature a tiered architecture for both security and scalability. Thereby, a single central server deployment may support hundreds or thousands of mobile units simultaneously. Access to the central server may be role based, with password protected messaging and message encryption. Such roles, current status, and current data may lend themselves to application at the central server of one or more databases, such as relational databases. Such database or databases may conveniently track, within the tiered system, all information required by the central server to efficiently task and monitor large numbers of handheld units, and may discreetly make available to ones of the mobile units such information as is required by only the authorized ones of the mobile unit users attempting to access the central server, and/or to send information via the central server to other mobile units or directly to other mobile unit users. Further, in addition to relaying messages and relating tracking information, the one or more central servers may incorporate a cryptographically authenticated, remote command framework(s) that allows the central server, if authenticated, to remotely manipulate one or more of the mobile devices.

The operating system of the mobile unit of present invention may control, in conjunction with the aforementioned modules, the operation of the information displayed to the user on the display via the local GUI. Further, in a preferred embodiment, the operating system of the present invention provides optimal flexibility to users of the mobile device via the capability to receive new software or hardware interfaces via a "push" from the central server. The operating system may be, for example, a Linux operating system, and may incorporate enhanced components, such as the advanced encryption standard (AES) mentioned above, and/or the RSA asymmetric encryption algorithm. Further, for example, a Linux operating system may incorporate additional enhancements, such as the National Security Agency's Security Enhanced Linux component. Further, the operating system of the present invention may employ software, plug-ins, add-ins, or the like from a variety of external sources, such as by download at initialization of the mobile unit, or such as by real-time updates pushed from the central server. For example, the present invention may employ source code from the Geospatial Data Abstraction Library (GDAL).

In turn, the central processing unit of the mobile device may operate the operating system, as well as the interface of the operating system with the aforementioned modules, the interface of one module to another module, and the interface of the modules with the central processing unit. The central processing unit (CPU) may be any central processing unit known to those skilled in the art, such as an Intel X Scale PXA 270 processing unit, and the central processing unit may actively interface with standard hardware devices to perform the tasks discussed above with regard to the various modules, such as a Ublox Antares Super Sense GPS Receiver, a Sarantel Geo Helix Active GPS Antenna, and such as an Adactus Quad Band GSM Antenna. Further, certain hardware, such as an additional antenna, may be incorporated into, or may necessitate modification in order to be made operable with, the present invention. Specifically, for example, the Sarantel Geo Helix SMP Passive GPS antenna may be modified to make the antenna suitable for use for communication with the Iridium satellite system through a communications modem, such as an Iridium 9601 (Taladaga) Short Burst Data Satellite Modem. More specifically, a GPS antenna, such as the Sarental Helical Antenna (Model No. SMP1010004), which may preferably be a quadrafilar helical antenna and which may have a center frequency of, for example, 1575.42 MHz, may be tuned to shift operation from the GPS frequency band to the Iridium frequency band (1616 MHz-1626.5 MHz) while maintaining a typical input impedance of 50 ohms, an antenna gain of −3.5 dBic and radiation pattern beamwidth of greater than 120 degrees.

Figure 3:
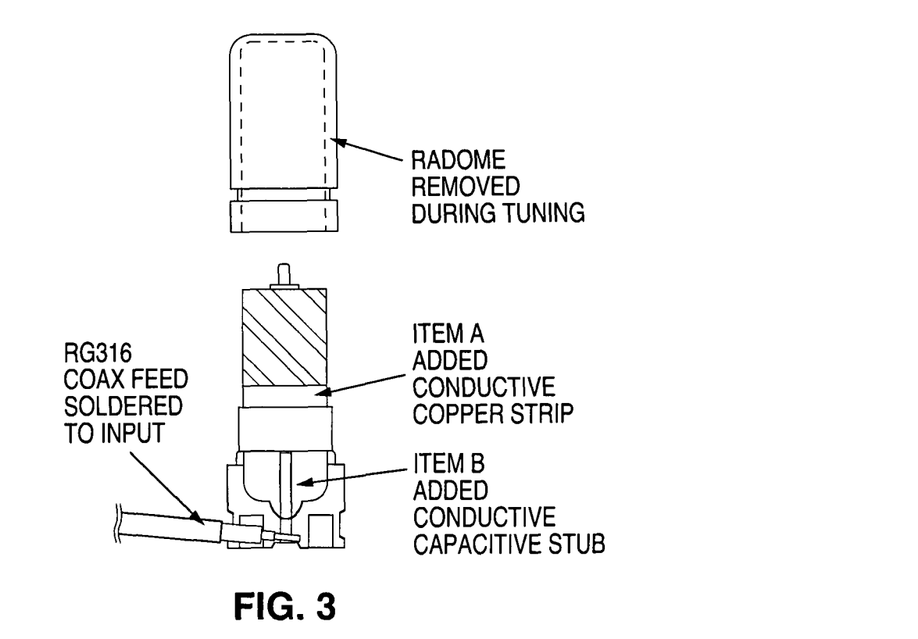
FIG. 3 is diagram of a modified antenna according to one embodiment of the present invention.

Such a novel Iridium antenna may be provided by the placement of a conductive strip around the circumference of a cylindrical dielectric core at the base of the helical windings of the exemplary GPS antenna. Such an embodiment is illustrated in FIG. 3. It will be apparent, in light of FIG. 3 and the discussion herein, that the GPS and Iridium antennae discussed herein are not limiting embodiments of the present invention, but rather are discussed only as exemplary embodiments of the modification of the electrical length of an antenna to vary the operating band of that antenna between two or more operating systems in accordance with the present invention.

More specifically with regard to the present exemplary embodiment, the conductive strip may be metallic, and in one exemplary embodiment may have an adhesive backing to allow for placement about the circumference. In one embodiment, for example, the strip may be an adhesive copper tape of approximately 0.05-0.15" in width, and yet more specifically of approximately 0.098" in width. Such a conductive, adhesive strip may preferably be of sufficient length to wrap completely around the circumference of the antenna. In alternative embodiments, a strip of conductive epoxy may be applied over a predefined template to the dielectric core of the quadrafilar helical antenna. Such template insures that the conductive pattern is accurately applied around the circumference of the antenna.

As discussed above, the bottom edge of the conductive strip may be placed around the circumference of the antenna around and just below the helical windings and at the base of the antenna, and as such may rest upon the top edge of the antenna's plastic support base. The top edge of the conductive strip may overlap the helical windings of the antenna, thereby electrically shortening the helical windings to shift the operating frequency range of the antenna from the GPS frequency range to the Iridium frequency range.

Figure 4A:
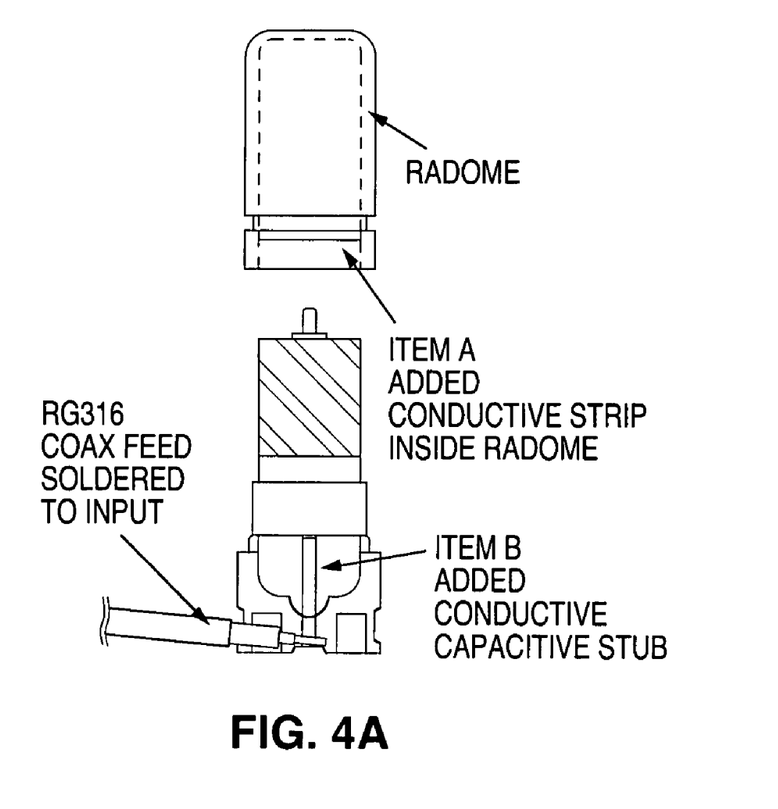
FIGS. 4(A) and 4(B) are further diagrams of the modified antenna according to one embodiment of the present invention.
Figure 4B:
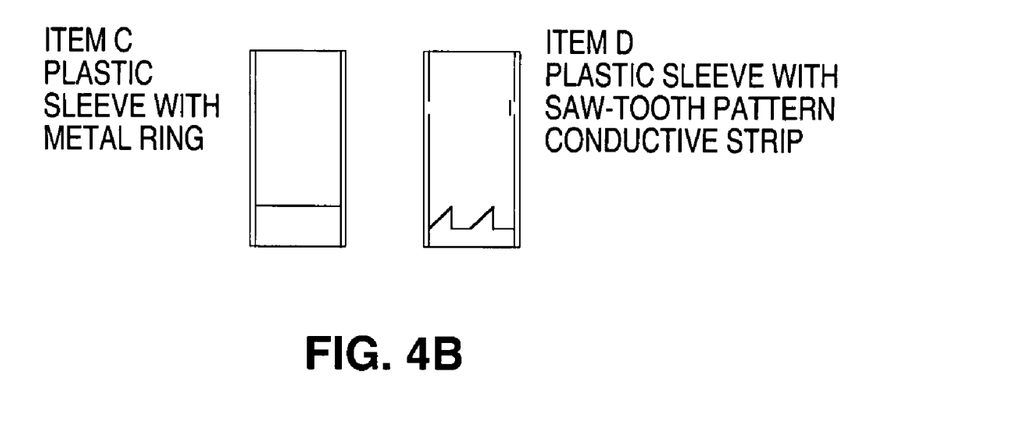

Yet more specifically with regard to this exemplary embodiment, the antenna would preferably include a radome, which may be removed during tuning of the antenna, which radome may have embedded therein the aforementioned conductive strip, as shown in FIGS. 4A and 4B. More specifically, the radome may consist of a plastic sleeve capable of having embedded therein one or more of the aforementioned conductive strips. As mentioned hereinabove, the conductive strip may be a conductive ring embedded in the bottom of the plastic sleeve, wherein the plastic sleeve is then pushed downward onto the antenna to provide the electrical shortening of the helical windings as discussed with respect to FIG. 3. Thereby, the subject antenna is retuned. Additionally and alternatively, the conductive strip may be a saw-toothed pattern that more finely tunes the subject antenna as the plastic sleeve is turned after the plastic sleeve is pushed downward over the antenna core. In such an embodiment, mechanical turning of the saw-tooth strip, either automatically or upon a user or central server request, may retune the antenna of the present invention.

The subject antenna for retuning to the Iridium frequency band typically includes a coaxial feed electrically connected, such as by soldering, to the input of the antenna. To provide further retuning of the subject antenna, a radio frequency capacitive stub, such as a stub formed of a conductor, such as of conductive copper, may be added to the input microstrip transmission line feed of the antenna to improve the input reflection co-efficient. The inclusion of such a capacitive stub may improve the voltage standing wave at the input to a better than 2 to 1 ratio. This capacitive stub may vary in length, and may specifically not be required if the input reflection coefficient is sufficiently small for the untuned antenna. Further, the capacitive stub may be replaced or augmented by a surface mountable chip capacitor.

Figure 5:
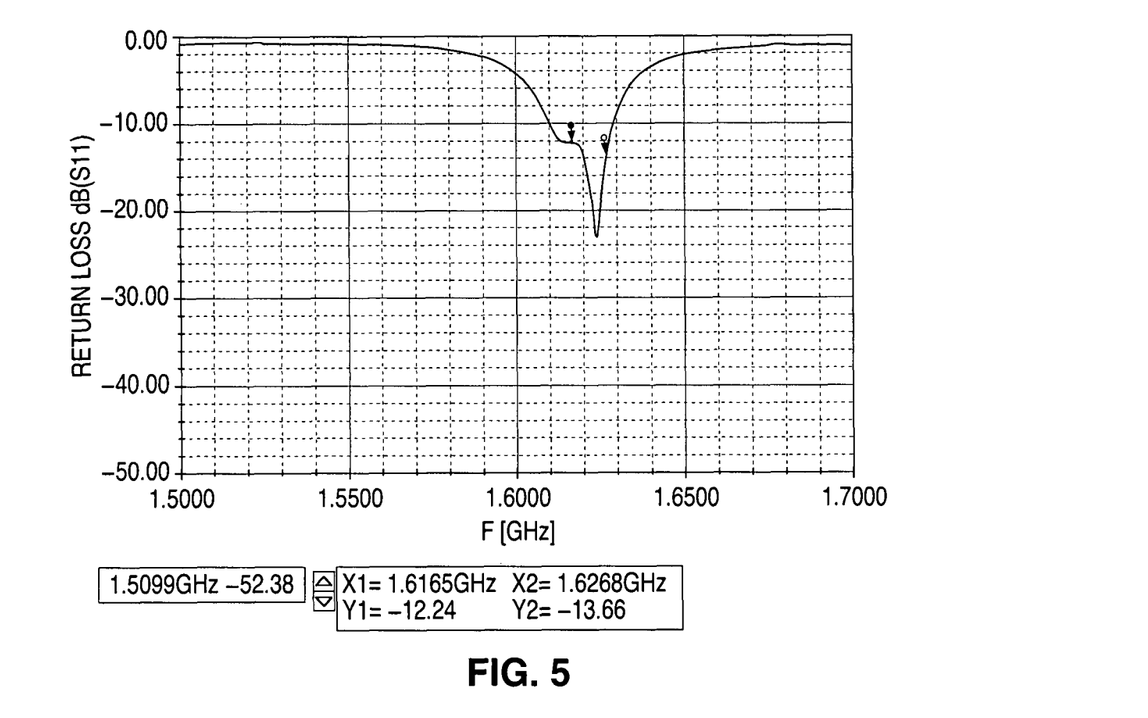
FIG. 5 is a graph illustrating the input return loss versus frequency of the modified antenna according to one embodiment of the present invention.

FIG. 5 illustrates the input return loss versus frequency of the modified antenna discussed above. Markers 1 and 2 in FIG. 5 illustrate that the tuned antenna has an acceptable input match across the iridium band, namely from 1616 MHz to 1626.5 MHz. An antenna so tuned may exhibit, for example, a return loss better than −10 dB across the band of interest.

Further, the tuned subject antenna exhibits center band gain and radiation patterns similar to the untuned antenna, but with a frequency shift in operation from the GPS frequency band to the Iridium frequency band. The center band gain for the tuned subject antenna is typically −3.5 dBic with radiation pattern beamwidth greater than 120 degrees while providing a typical input impedance of 50 ohms.

Alternatively, an Antcom model S1.5IR16RR-P-1.5BMM-X may be used instead of the modified Sarantel Geo Helix SMP Passive GPS antenna.

The CPU and its associated hardware may readily be integrated to an optimally sized hand held unit, such as a unit that is two to three inches in width, three to six inches in height, and less than two inches in depth. Such a unit is more compact than units previously known in the art, and the integration of multiple functions into a single mobile unit in the present invention eliminates the need for a mobile user to carry multiple devices to carry out multiple functions. The device of the present invention may further provide various conveniences in order to improve functionality and operability, such as by providing the capability to operate using batteries or external power, such as recharging power, plug-in power, solar power, or the like. Further, without adversely affecting the compact size of the present invention, the present invention may efficiently support the use of a variety of different communications using one or several size-optimal built-in antennas, such as including both an external GPS and external Iridium antennas conveniently placed at opposite points along the width, or height, of the device. Further, in order to improve hardware extensibility, the present device may include standard computer interoperability features, such as USB interfaces, card-based secure digital storage, external hard drive capability, and antenna, Ethernet, modem, or firewire communication plug-ins, for example.

Those of ordinary skill in the art will recognize that many modifications and variations of the present invention may be implemented. The foregoing description is intended to cover all such modifications and variations, and the equivalents thereof.

What is claimed is:

1. A handheld device, comprising:
   at least one mapping module;
   at least one tracking module interoperative with said at least one mapping module;
   at least one communications module interoperative with each of said at least one tracking module and said at least one mapping module; and
   at least two antennae communicatively connected via said at least one communications module to at least one central processing unit, at least one of said at least two antennae is suitable for communicating using at least two distinct communication modes, the at least two distinct communication modes includes at least two of an Iridium satellite communication mode, a general packet radio service (GPRS) communication mode, an emergency locating beacon, a global system for mobile communications (GSM) communication mode, a short message service (SMS) communication mode, or a 9-1-1 communication mode, the at least one communications module is configured to determine which communication mode from the at least two distinct communication modes to use based on a status of an asset collocated with the handheld device.

2. The handheld device of claim 1, further comprising a Global Positioning System (GPS) receiver interoperative with at least one of said at least one mapping module, said at least one tracking module and said at least one communications module.

3. The handheld device of claim 2, further comprising:
   an operating system configured to process data associated with at least one of said at least one mapping module, said at least one tracking module and said at least one communications module; and
   a display.

4. The handheld device of claim 1, further comprising:
   at least one sensor configured to provide information associated with a condition external to said at least one tracking module.

5. The handheld device of claim 1, wherein the at least one communications module is configured to operate in connection with the at least two distinct communication modes, such that if a first communication mode from the at least two communication modes is inoperable, the at least one communications module can utilize a second communication mode from the at least two distinct communication modes.

6. The handheld device of claim 1, wherein the at least one tracking module is configured to receive information associated with a plurality of assets.

7. The handheld device of claim 1, wherein the at least one tracking module is in communication with at least one of a damage sensor, a pressure sensor or a weight sensor associated with the asset.

8. The handheld device of claim 1, wherein the at least one tracking module is in communication with a sensor configured to monitor a bodily function of a human asset.

9. The handheld device of claim 1, wherein an antenna of the at least two antennae is a satellite antenna and at least one of the at least two antennae is a GPS antenna.

10. A communications system, comprising:
at least one server including:
a communications module;
a central processing unit; and
a graphical user interface; and
a plurality of handheld devices, each handheld device configured to communicate with the at least one server, each handheld device including:
at least one mapping module;
at least one tracking module interoperative with said at least one mapping module;
at least one communications module interoperative with each of said at least one tracking module and said at least one mapping module, said at least one communications module configured to operate in connection with at least two distinct communication modes;
a Global Positioning System (GPS) receiver interoperative with at least one of said at least one mapping module, said at least one tracking module and said at least one communications module; and
at least two antennae communicatively connected via said at least one communications module to at least one central processing unit, at least one of said at least two antennae is suitable for communications using the at least two distinct communication modes, the at least one communications module configured to determine which communication mode from the at least two distinct communication modes to use based on a status of an asset collocated with the handheld device;
wherein the at least one server is configured to display a location of each handheld device from the plurality of handheld devices on the graphical user interface.

11. The communications system of claim 10, wherein each handheld device from the plurality of handheld devices is configured to dynamically relay position and direction map data to the at least one server.

12. The communications system of claim 11, wherein each handheld device from the plurality of handheld devices is configured to relay the position and direction map data to at least one other handheld device from the plurality of handheld devices.

13. The communications system of claim 11, wherein each handheld device from the plurality of handheld devices includes:
an operating system; and
a display configured to display the position and direction map data.

14. The communications system of claim 10, wherein each handheld device from the plurality of handheld devices includes at least one sensor configured to provide information associated with a condition external to said at least one tracking module.

15. The communications system of claim 10, wherein the at least two distinct communication modes includes at least two of an Iridium satellite communication mode, a general packet radio service (GPRS) communication mode, an emergency locating beacon, a global system for mobile communications (GSM) communication mode, a short message service (SMS) communication mode, or a 9-1-1 communication mode.

16. A processor-readable medium storing code representing instructions to cause a processor to:
receive, at a first mobile device, a first signal indicating a current position of the first mobile device;
receive, via a first communication mode, at least one second signal from at least one second mobile device indicating a status of at least one asset collocated with the at least one second mobile device, the status being monitored by at least one sensor operatively coupled to the at least one second mobile device, the first communication mode being used based on the status of the at least one asset;
send, via a second communication mode different from the first communication mode, a third signal associated with the status of the at least one asset to a server; and
receive a fourth signal from the server allowing the server to manipulate the first mobile device in response to sending the third signal.

17. The processor-readable medium of claim 16, wherein the first signal is received using a first antenna and the at least one second signal is received using a second antenna.

18. The processor-readable medium of claim 16, wherein the at least one sensor operatively coupled to the at least one second mobile device includes at least one of a damage sensor, a pressure sensor or a weight sensor.

19. The processor-readable medium of claim 16, the code further comprising code representing instructions to cause a processor to:
switch from using the a first communication mode to using the a second communication mode when the status of the at least one asset is one of at least one predefined status.

20. The processor-readable medium of claim 16, wherein the at least one asset is a human, the status including a status of a bodily function of the human.

21. The processor-readable medium of claim 16, the code further comprising code representing instructions to cause a processor to:
send a fifth signal associated with the status of the at least one asset to at least one third mobile device.

22. The processor-readable medium of claim 16, the code further comprising code representing instructions to cause a processor to:
receive a fifth signal from the at least one second mobile device indicating a position of the at least one second mobile device; and
sending a sixth signal to the server indicating the position of the at least one second mobile device.

23. The processor-readable medium of claim 16, wherein the first signal is received using a satellite antenna.

* * * * *